United States Patent
Ghannam et al.

(10) Patent No.: US 10,369,972 B2
(45) Date of Patent: Aug. 6, 2019

(54) GRAVITY BASED VEHICLE CAMERA CLEANING SYSTEMS AND METHODS

(71) Applicant: Ford Global Technologies, LLC, Dearborn, MI (US)

(72) Inventors: Mahmoud Yousef Ghannam, Canton, MI (US); David James Tippy, Ann Arbor, MI (US); Steven Yellin Schondorf, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 55 days.

(21) Appl. No.: 15/494,365

(22) Filed: Apr. 21, 2017

(65) Prior Publication Data

US 2018/0304864 A1 Oct. 25, 2018

(51) Int. Cl.
| | |
|---|---|
| *B60S 1/56* | (2006.01) |
| *B08B 3/04* | (2006.01) |
| *B60S 1/08* | (2006.01) |
| *B60S 1/48* | (2006.01) |
| *G02B 27/00* | (2006.01) |
| *H04N 5/225* | (2006.01) |
| *B08B 1/00* | (2006.01) |
| *B60R 11/04* | (2006.01) |
| *B60R 11/00* | (2006.01) |

(52) U.S. Cl.
CPC .............. *B60S 1/566* (2013.01); *B08B 1/005* (2013.01); *B08B 3/04* (2013.01); *B60S 1/0803* (2013.01); *B60S 1/481* (2013.01); *B60S 1/482* (2013.01); *G02B 27/0006* (2013.01); *H04N 5/2251* (2013.01); *H04N 5/2252* (2013.01); *H04N 5/22521* (2018.08); *B60R 11/04* (2013.01); *B60R 2011/004* (2013.01)

(58) Field of Classification Search
None
See application file for complete search history.

(56) References Cited

U.S. PATENT DOCUMENTS

| | | | |
|---|---|---|---|
| 3,259,069 A | 7/1966 | Rogakos | |
| 3,407,426 A | 10/1968 | Muller | |
| (Continued) | | | |

FOREIGN PATENT DOCUMENTS

| | | |
|---|---|---|
| CN | 203157944 U | 8/2013 |
| CN | 104646331 A | 5/2015 |
| (Continued) | | |

OTHER PUBLICATIONS

Thompson, "Google wants all its self-driving cars to clean themselves—here's why", Tech Insider, May 5, 2016 (Year: 2016).*

(Continued)

*Primary Examiner* — Tamara L Weber
(74) *Attorney, Agent, or Firm* — Frank Lollo; Neal, Gerber & Eisenberg LLP; James P. Muraff (57) ABSTRACT

Methods and systems are disclosed for cleaning a rear view vehicle camera. An example vehicle camera cleaning system includes a camera, a blade for cleaning a lens of the camera, a fluid reservoir for dispensing fluid using gravity via a one-directional gateway valve, and an actuator for moving the blade vertically across the lens, wherein the fluid reservoir dispenses fluid responsive to actuation of the blade.

17 Claims, 6 Drawing Sheets

(56) References Cited

U.S. PATENT DOCUMENTS

| | | | |
|---|---|---|---|
| 3,837,036 A * | 9/1974 | Burger | B60S 1/3402 |
| | | | 15/250.23 |
| 3,924,290 A * | 12/1975 | Puyplat | B60S 1/3404 |
| | | | 15/250.002 |
| 4,421,464 A | 12/1983 | Schmidt | |
| 4,565,497 A | 1/1986 | Miller et al. | |
| 4,721,251 A | 1/1988 | Kondo | |
| 5,730,806 A | 3/1998 | Caimi | |
| 6,527,000 B1 | 3/2003 | Randmae et al. | |
| 7,800,682 B2 | 9/2010 | Nagamine | |
| 8,118,501 B2 | 2/2012 | Buschmann | |
| 8,567,963 B1 | 10/2013 | Criscuolo | |
| 8,753,025 B2 | 6/2014 | Suman | |
| 8,864,392 B2 | 10/2014 | Alexander et al. | |
| 8,982,273 B2 | 3/2015 | Bingle et al. | |
| 9,180,840 B2 | 11/2015 | Tanaka et al. | |
| 9,602,703 B1 | 3/2017 | Raphael | |
| 2001/0054655 A1 | 12/2001 | Berg | |
| 2002/0005440 A1 | 1/2002 | Holt | |
| 2002/0134857 A1 | 9/2002 | Zimmer | |
| 2002/0139394 A1 | 10/2002 | Bronson | |
| 2011/0141562 A1 | 6/2011 | Okazawa | |
| 2011/0210151 A1 | 9/2011 | Weikert | |
| 2012/0000024 A1 | 1/2012 | Layton | |
| 2013/0010115 A1 | 1/2013 | Jerusalem et al. | |
| 2013/0028588 A1 | 1/2013 | Suman et al. | |
| 2013/0048035 A1 | 2/2013 | Doi et al. | |
| 2013/0086765 A1 | 4/2013 | Chen | |
| 2014/0020201 A1 | 1/2014 | Bunt | |
| 2014/0232869 A1* | 8/2014 | May | H04N 7/18 |
| | | | 348/148 |
| 2014/0247324 A1 | 9/2014 | Cury | |
| 2015/0246660 A1 | 9/2015 | Seedall | |
| 2015/0343999 A1 | 12/2015 | Lopez Galera | |
| 2015/0353024 A1* | 12/2015 | Cooper | B60R 11/04 |
| | | | 348/148 |
| 2016/0096512 A1* | 4/2016 | Giraud | B60S 1/0848 |
| | | | 15/250.04 |
| 2016/0121855 A1 | 5/2016 | Doorley et al. | |
| 2017/0080863 A1 | 3/2017 | Henion | |

FOREIGN PATENT DOCUMENTS

| | | | |
|---|---|---|---|
| CN | 204685543 | * | 10/2015 |
| CN | 206141507 U | | 5/2017 |
| DE | 102005021670 A1 | | 11/2006 |
| DE | 102005021672 A1 | | 11/2006 |
| DE | 102008027430 A1 | | 2/2009 |
| DE | 102014220573 A1 | | 10/2014 |
| EP | 2845773 A1 | | 9/2013 |
| EP | 2955069 A1 | | 12/2015 |
| FR | 1487655 A | | 7/1967 |
| GB | 2548212 A | | 9/1917 |
| GB | 672190 A | | 5/1952 |
| GB | 764901 A | | 1/1957 |
| GB | 860087 A | | 2/1961 |
| GB | 941460 A | | 11/1963 |
| GB | 1333085 A | | 10/1973 |
| GB | 1428169 A | | 3/1976 |
| GB | 2255539 A | | 11/1992 |
| GB | 2507408 A | | 4/2014 |
| JP | 2001199492 A | | 7/2001 |
| JP | 2009225179 A | | 10/2009 |
| JP | 2013081097 A | | 5/2013 |
| JP | 2015182656 A | | 10/2015 |
| KR | 20110059055 A | | 6/2011 |
| KR | 20160050737 A | | 5/2016 |
| WO | WO 2015/003705 A1 | | 1/2015 |
| WO | WO 2015/120866 A1 | | 8/2015 |
| WO | WO 2015198645 A1 | | 12/2015 |

OTHER PUBLICATIONS

Search Report dated Jul. 5, 2017 for Great Britain Patent Application No. GB1701048.9 (4 Pages).

Dan Mihalascu, *Nissan Debuts Intelligent Self-Cleaning Rear View Camera on New Note*, Carscoops, Jun. 14, 2013 (2 Pages).

Search Report dated Sep. 27, 2017, for GB Patent Application No. GB1705029.5 (5 Pages).

Search Report dated Oct. 16, 2018 for GB Patent Application No. GB 1806662.1 (5 pages).

Search Report dated Sep. 28, 2018 for GB Patent Application No. GB 1806484.0 (5 pages).

* cited by examiner

GRAVITY BASED VEHICLE CAMERA CLEANING SYSTEMS AND METHODS

TECHNICAL FIELD

The present disclosure generally relates to cleaning mechanisms for vehicle cameras and, more specifically, gravity based vehicle camera cleaning mechanisms, systems, and methods.

BACKGROUND

Modern vehicles may include a rear view camera for use while the vehicle is in a reverse gear. The rear view camera may provide the driver with a view of the area immediately behind the vehicle, which may increase safety and enable the driver to avoid crashing or running into objects when reversing.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown for gravity based vehicle camera cleaning systems and methods. An example disclosed vehicle camera cleaning systems includes a camera, a blade for cleaning a lens of the camera, a fluid reservoir for dispensing fluid using gravity via a one-directional gateway valve, and an actuator for moving the blade vertically across the lens, wherein the fluid reservoir dispenses fluid responsive to actuation of the blade.

An example disclosed method for cleaning a vehicle camera includes receiving an instruction to clean a vehicle camera lens. The method also includes actuating a blade vertically across the lens, wherein a fluid reservoir for dispensing fluid using gravity via a one-directional gateway valve is located directly above the lens, and wherein the fluid reservoir dispenses fluid responsive to actuation of the blade.

Another example may include means for receiving an instruction to clean a vehicle camera lens. The example also includes means for actuating a blade vertically across the lens, wherein a fluid reservoir for dispensing fluid using gravity via a one-directional gateway valve is located directly above the lens, and wherein the fluid reservoir dispenses fluid responsive to actuation of the blade

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Modern vehicles may include a rear facing or rear view camera for use by the driver or vehicle systems, especially while the vehicle is in a reverse gear. Varying road and weather conditions may cause the rear view camera to operate improperly, such as with a blurry or obstructed view. Fog, condensation, rain, snow, ice, or dirt may build up on the lens of the camera and cause problems with the camera functionality.

Some vehicles may include a camera cleaning system, in which a cleaning liquid is sprayed onto the lens and then wiped dry. But where the camera is located at a rear end of the vehicle, additional tubing, systems, and/or a high powered pump may be needed to compensate for a drop in pressure between the cleaning liquid reservoir and the camera. Further, some vehicles (such as trucks) may not include rear cleaning systems at all.

In some examples described herein, a cleaning system may make use of gravity to spray cleaning liquid onto the camera lens, and may use curved or arched blade to wipe the lens. The use of gravity as a force to disperse the liquid may reduce the complexity of the system, allowing for use in vehicles in which it would otherwise not be feasible.

I. Example Vehicle

Figure 1A:
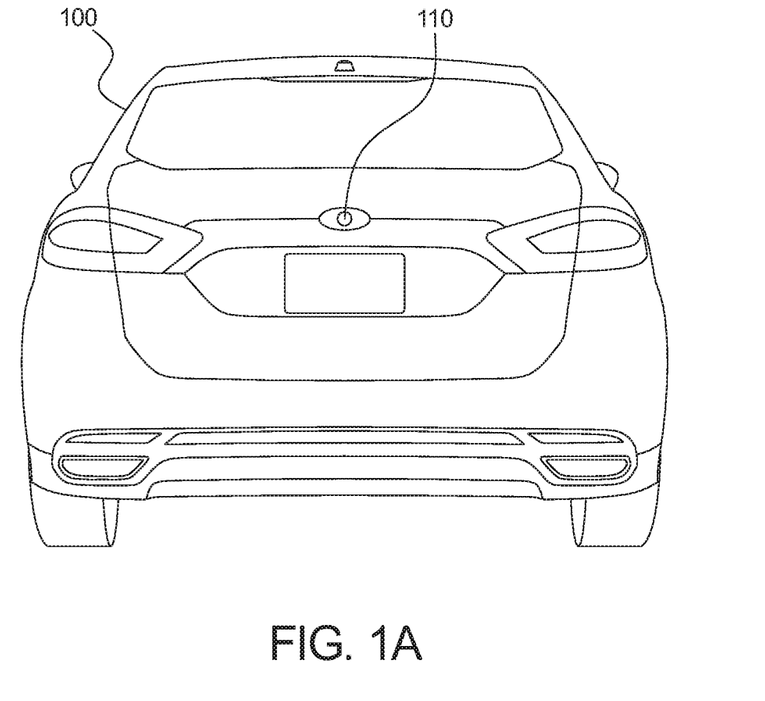
FIG. 1A illustrates an example rear view of a vehicle according to embodiments of the present disclosure.

FIG. 1A illustrates a perspective view of the rear end of an example vehicle 100. Vehicle 100 may be a standard gasoline powered vehicle, a hybrid vehicle, an electric vehicle, a fuel cell vehicle, and/or any other mobility implement type of vehicle. Vehicle 100 may include parts related to mobility, such as a powertrain with an engine, a transmission, a suspension, a driveshaft, and/or wheels, etc. Vehicle 100 may be non-autonomous, semi-autonomous (e.g., some routine motive functions controlled by the vehicle 100), or autonomous (e.g., motive functions are controlled by vehicle 100 without direct driver input). In the illustrated example, vehicle 100 includes a rear view camera 110. Vehicle 100 may also include one or more components described below with respect to FIG. 2.

Rear view camera 110 may provide video images directed behind vehicle 100. Rear view camera 110 may be positioned on a rear end of vehicle 100, for instance proximate a rear license plate, rear liftgate, rear diffuser, or a brake light.

Figure 1B:
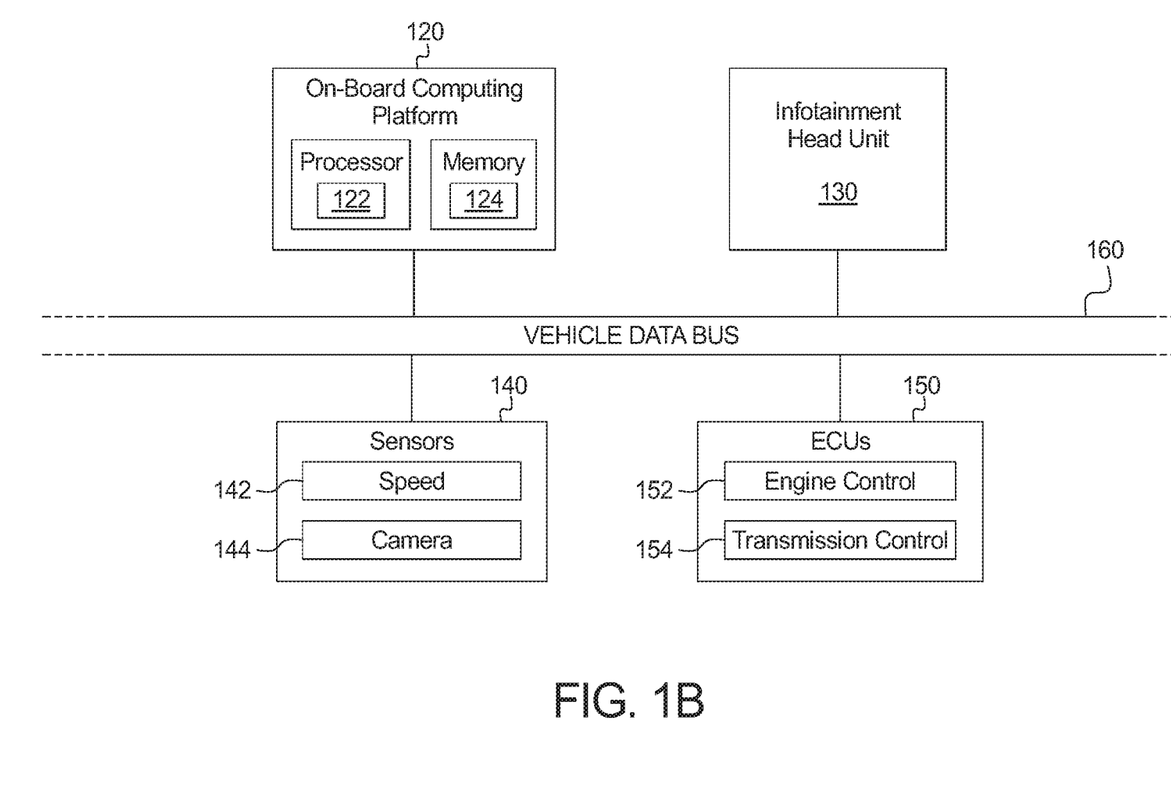
FIG. 1B illustrates an example block diagram of electronic components of the vehicle of FIG. 1A.

FIG. 1B illustrates a block diagram of the electric components of vehicle 100 of FIG. 1A. The electric components may include an on-board computing platform 120, an infotainment head unit 130, sensors 140, and electronic control units (ECUs) 150, all of which may communicate or send/transmit data via vehicle data bus 160.

The on-board computing platform 120 may include a processor or controller 122 and memory 124. The processor or controller 122 may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs). The memory 124 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, memristor-based non-volatile solid-state memory, etc.), unalterable memory (e.g., EPROMs), and read-only memory. In some examples, the memory 124 may include multiple kinds of memory, particularly volatile memory and non-volatile memory.

Memory 124 may be a computer readable medium on which one or more sets of instructions, such as the software for operating the methods of the present disclosure can be embedded. The instructions may embody one or more of the methods or logic as described herein. In a particular embodiment, the instructions may reside completely, or at least partially, within any one or more of the memory 124, the computer readable medium, and/or within the processor 122 during execution of the instructions.

The terms "non-transitory computer-readable medium" and "computer-readable medium" should be understood to include a single medium or multiple media, such as a centralized or distributed database, and/or associated caches and servers that store one or more sets of instructions. The terms "non-transitory computer-readable medium" and "computer-readable medium" also include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The infotainment head unit 130 may provide an interface between the rear view camera 110, vehicle 100, and a user (e.g., a driver, a passenger, etc.). The infotainment head unit 130 may include digital and/or analog interfaces (e.g., input devices and output devices) to receive input from the user(s) and display information. In one particular example, the infotainment head unit 130 includes a button selectable by the user that causes the cleaning system described herein to activate. The input devices may include, for example, a control knob, an instrument panel, a digital camera for image capture and/or visual command recognition, a touch screen, an audio input device (e.g., cabin microphone), buttons, or a touchpad. The output devices may include instrument cluster outputs (e.g., dials, lighting devices), actuators, a dashboard panel, a heads-up display, a center console display (e.g., a liquid crystal display ("LCD"), an organic light emitting diode ("OLED") display, a flat panel display, a solid state display, or a heads-up display), and/or speakers. The infotainment head unit 130 may be communicatively coupled to the rear view camera 110. In some examples, the images from the rear view camera 110 are displayed on the center console display of the infotainment head unit 130. In some examples, the images from the rear view camera 110 are displayed on a portion of a rear view mirror (not shown).

The sensors 140 may be arranged in and around vehicle 100 in any suitable fashion. Sensors 140 may include a speed sensor 142 and rear view camera 110, as well as one or more other sensors (not shown). In some examples, sensors 140 may include one or more condensation sensors, fog sensors, or other obstruction sensors or circuits configured to determine when a view of rear view camera 110 is obstructed or unclear.

The ECUs 150 monitor and control the systems of vehicle 100. The ECUs 150 may communicate and exchange information via the vehicle data bus 160. Additionally, the ECUs 150 may communicate properties (such as, status of the ECU 150, sensor readings, control state, error and diagnostic codes, etc.) to and/or receive requests from other ECUs 150. Some vehicles 100 may have seventy or more ECUs 150 located in various locations around vehicle 100 communicatively coupled by the vehicle data bus 160. The ECUs 150 may be are discrete sets of electronics that include their own circuit(s) (such as integrated circuits, microprocessors, memory, storage, etc.) and firmware, sensors, actuators, and/or mounting hardware. In the illustrated example, the ECUs 150 includes an engine control unit 152 and a transmission control unit 154.

The vehicle data bus 160 may communicatively couple the sensors 140, the ECUs 150, the on-board computing platform 120, the infotainment head unit 130, and other devices connected to the vehicle data bus 160. In some examples, the vehicle data bus 160 is implemented in accordance with the controller area network (CAN) bus protocol as defined by International Standards Organization (ISO) 11898-1. Alternatively, in some examples, the vehicle data bus 160 may be a Media Oriented Systems Transport (MOST) bus, or a CAN flexible data (CAN-FD) bus (ISO 11898-7).

II. Example Cleaning Mechanisms

Figure 2A:
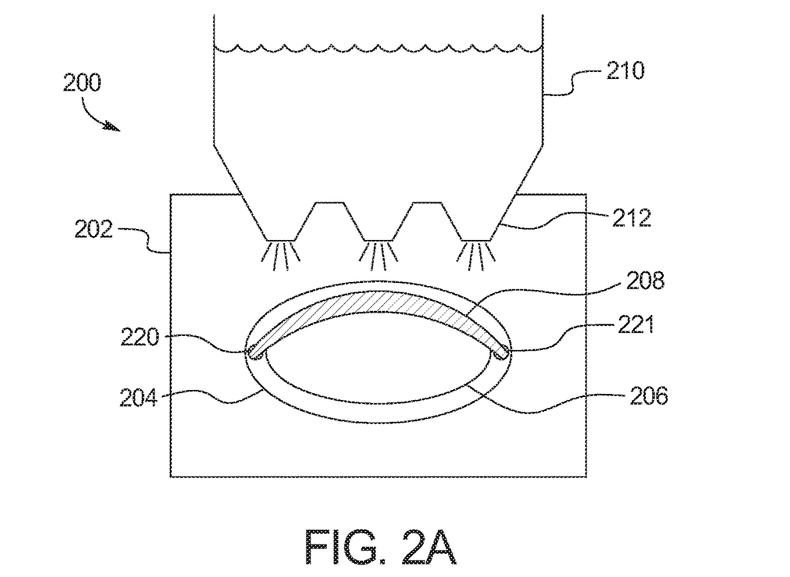
FIGS. 2A and 2B illustrate a front perspective view of the operation of an example blade according to embodiments of the present disclosure.
Figure 2B:
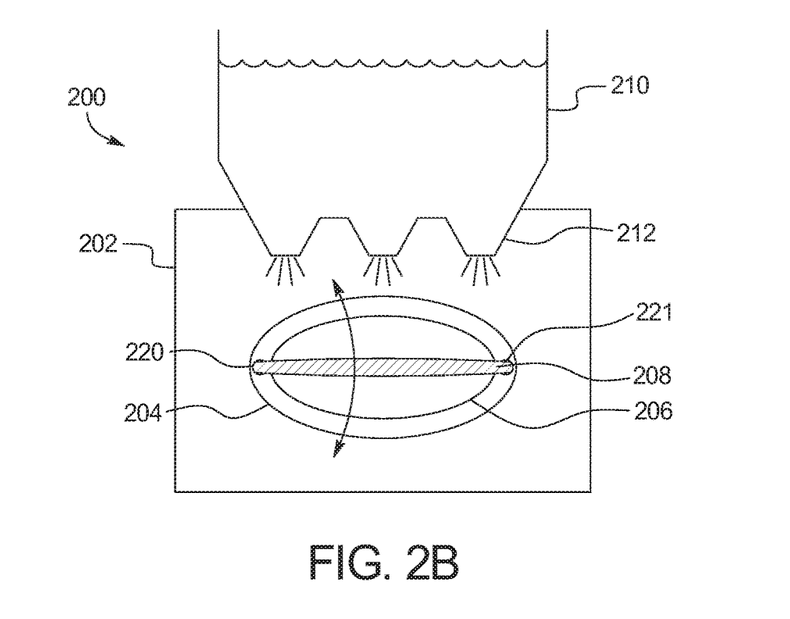

FIGS. 2A and 2B illustrate a front perspective view of the operation of an example cleaning system 200 according to embodiments of the present disclosure.

System 200 may operate by actuating blade 208 in a blinking manner, as shown in FIGS. 2A and 2B. System 200 may include a housing 202 with an opening 204, through which a lens 206 of the rear view vehicle camera.

Housing 202 may be plastic, metal, or another material configured to protect the rear view camera and cleaning system 200. Housing 202 may be positioned on the rear end of the vehicle. In some cases, the opening 204 of housing 202 may be shaped to match a shape of the lens 206 of the rear view camera. As such, while the opening is shown in FIGS. 2A and 2B as an oval, a circle, square, rectangle or other shape may be used. Further, the opening 204 is shown in a central portion of the housing 202, but other positions with respect to housing 202 may be used as well, such as offset laterally or vertically with respect to the center of the housing.

Housing 202 may also be configured to cover or protect one or more other components of system 200, including the reservoir 210 and/or one or more sensors described herein.

Lens 206 may be any shape configured to provide the rear view camera with a useful view. For instance, lens 206 may be convex, concave, circular, rectangular, or any other shape. Further, lens 206 may be configured to protrude through the opening 204 in housing 202, such that the housing 202 does not obstruct a view through lens 206.

In some examples, lens 206 may include one or more sensors or components configured to detect when the lens is obstructed. The sensors may include a condensation sensor, dirt sensor, and more.

Blade 208 of system 200 may be configured to wipe across lens 206, and may be comprised of plastic, rubber, a composite, or any other suitable material. Blade 208 may be rigid, flexible, semi-rigid, or any combination thereof. For instance, blade 208 may be generally rigid but with a flexible edge, such that the blade maintains an arched shape generally, but flexes on the edge in contact with lens 206. In some cases, the shape and/or material of blade 208 may be selected for a specific purpose, such as for the purpose of cleaning away debris, condensation, or other lens obstructions.

In some examples, blade 208 may be curved, arched, or bent. Blade 208 may be configured to mirror the shape of lens 206 (i.e., convex, concave, circle, oval, oblong, etc.). As shown in FIGS. 2A and 2B, blade 208 may be connected to housing 202, the rear view camera, or to another component of system 200 at two end points (220 and 221 respectively). In some examples, one or both end points 220 and 221 may be coupled to an actuator, gear, belt, spring, fixed point, another mechanism, or may be free floating. Example coupling scenarios are described in further detail with respect to FIG. 4.

In some examples, blade 208 may be uncovered by housing 202 prior to actuation. Alternatively, blade 208 may be covered by housing 202 prior to and after actuation in a resting or default position. This may provide protection to blade 208 while not in use and may keep blade 208 out of the line of sight of the rear view camera and/or lens 206.

System 200 may also include a cleaning liquid reservoir 210. Reservoir 210 may have an opening configured to accept cleaning fluid input by a user, which may be on the top side. Reservoir 210 may have one or more valves or nozzles 212 on the bottom side configured to dispense the cleaning fluid via the force of gravity. The valves 212 may be one-way or one-directional gateway valves. In some examples, reservoir 210 may have a single one-directional gateway coupled to a plurality of openings, such that the valve is configured to open and dispense liquid across the surface of lens 206.

In some examples, cleaning liquid may be dispersed through the end of a tube connected to reservoir 210 (not shown). The tube may be long to allow reservoir 210 to be located apart from the rest of system 200. In this scenario, the reservoir may still be located such that gravity causes the cleaning liquid to be dispensed. Further, valve 212 may be at either end of the tube or somewhere in between.

Reservoir 210 may include one or more sensors configured to detect an amount of cleaning liquid in the reservoir. This may include a pressure system, floating arm, or other sensing device.

In some examples, dispersing the cleaning liquid onto lens 206 may be conditioned upon activation of blade 208, such as when blade 208 moves or is actuated for example. A triggering event may cause blade 208 to be actuated prior to the reservoir dispersing cleaning liquid onto lens 206. In practice, then may include activating the valve 212 prior to or at the same time as blade 208 is actuated. In some examples, the movement of blade 208 may cause a lever coupled to the valve 212 to open, thus dispersing liquid onto lens 206. Movement of blade 208 to a return position may then close the valve.

In some examples, one or more trigger events or conditions may cause cleaning system 200 to activate. Trigger conditions may include a button being pressed by a user (either on a touch screen or a physical button) via a vehicle infotainment head unit or other component of the vehicle. Other triggers may include automatically upon starting the car, automatically upon entering a reverse gear, or upon the detection of an obstruction or unclear image via one or more sensors or systems.

Figure 3:
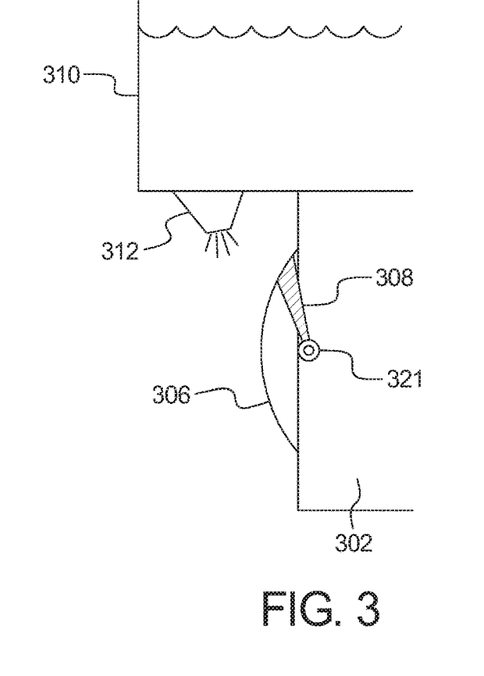
FIG. 3 illustrates a side perspective view of an example cleaning system according to embodiments of the present disclosure.

FIG. 3 illustrates a side perspective view of an example cleaning system of the present disclosure. In FIG. 3, housing 302 may be the same or similar to housing 202 of FIGS. 2A and 2B. Housing 302 may include an opening (not shown) through which lens 306 can protrude. As shown in FIG. 3, lens 306 is convex in shape. In other examples, lens 306 may be recessed back into housing 302 such that it does not protrude.

FIG. 3 also shows blade 308, with a first end point 221 coupled to housing 302. The second endpoint (not shown) is attached to the housing on the other side of the lens 306.

The cleaning system of FIG. 3 may also include reservoir 310, which is positioned directly above the lens 306. The reservoir may include gateway valve 312 configured to disperse liquid onto lens 306.

Figure 4:
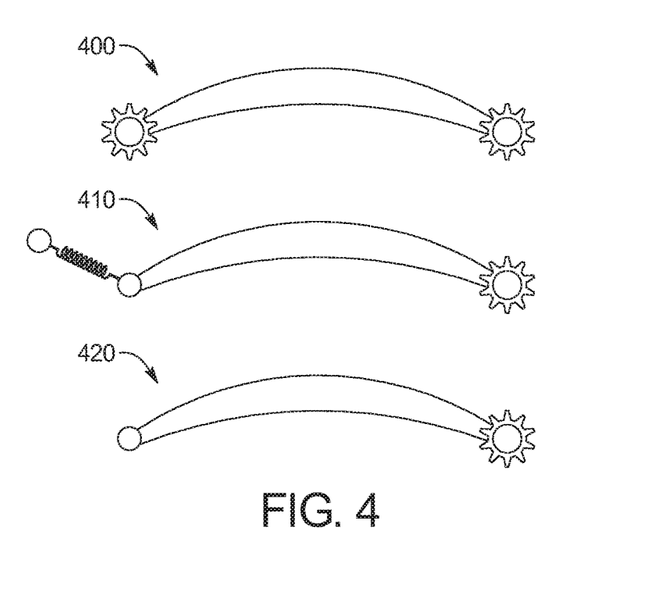
FIG. 4 illustrated three example blade connection types according to embodiments of the present disclosure.

FIG. 4 illustrates three example connection types 400, 410, and 420 for blades of the present disclosure.

Connection 400 may include actuation of both sides of the blade. In some examples, each side may be coupled to an actuator via a gear, pulley, or other mechanism, and both actuators may operate in tandem to rotate the blade up and down. Alternatively, a single actuator may be coupled to both sides of the blade.

Connection 410 may include a spring or other flexible member on one side of the blade. The spring may bias the blade in one direction, such that an actuator coupled to the other side may actuate the blade in a first direction from an initial position (e.g., from a top initial position to the bottom of the lens), while the spring or flexible member returns the blade to the initial position.

Connection 420 may include the blade being fixed on one side, and actuated on the other side. The fixed side may be coupled to a bearing or other member that enables the blade to rotate across the lens.

FIG. 5 illustrates an example cleaning system of the present disclosure as it progresses through in four stages.

Figure 5A:
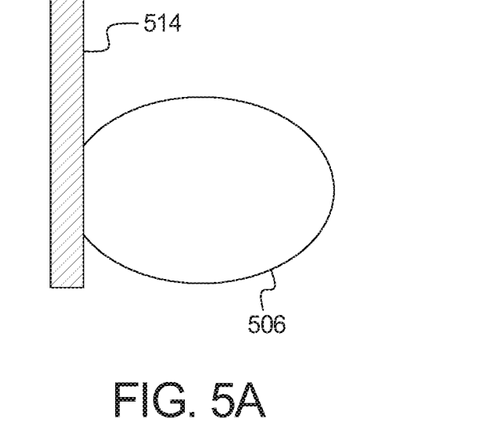
FIGS. 5A-D illustrate four stages of an example wiping mechanism according to embodiments of the present disclosure.

The cleaning system includes a lens 506, a rotatable pillar 514, and a blade 508. The rotatable pillar 514 may include one or more nozzles or valves configured to disperse cleaning liquid onto the lens, and may be connected to blade 508. FIG. 5A illustrates a pre-activation view, in which the pillar 514 begins to the side of lens 506. Blade 508 (not shown) is positioned to the side and/or behind lens 506.

Figure 5B:
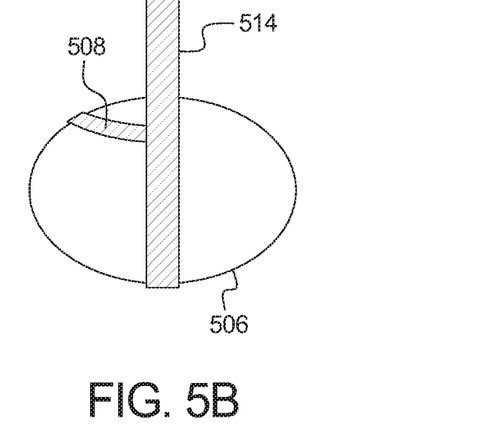

FIG. 5B illustrates a second view, in which pillar 514 and blade 508 rotate laterally across lens 506. While the rotation is in progress, one or more nozzles or valves on pillar 514 may disperse cleaning liquid onto lens 506.

Figure 5C:
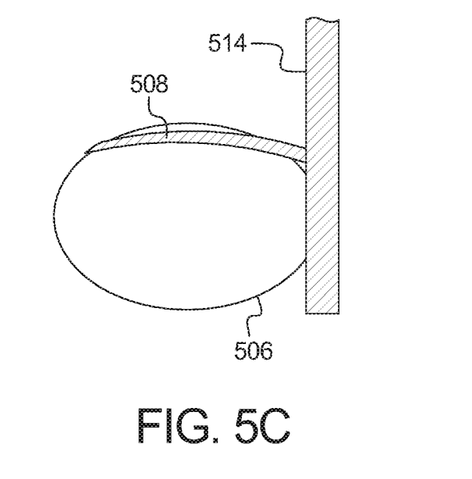
Figure 5D:
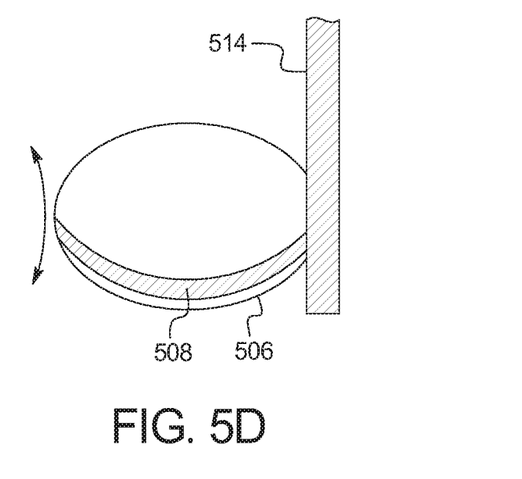

FIG. 5C illustrates a third view in which pillar 514 and blade 508 have completed the lateral rotation. In FIG. 5D, blade 508 is actuated such that it cleans lens 506 by moving up and down across the lens that was previously covered by cleaning liquid.

III. Example Flowcharts

Figure 6:
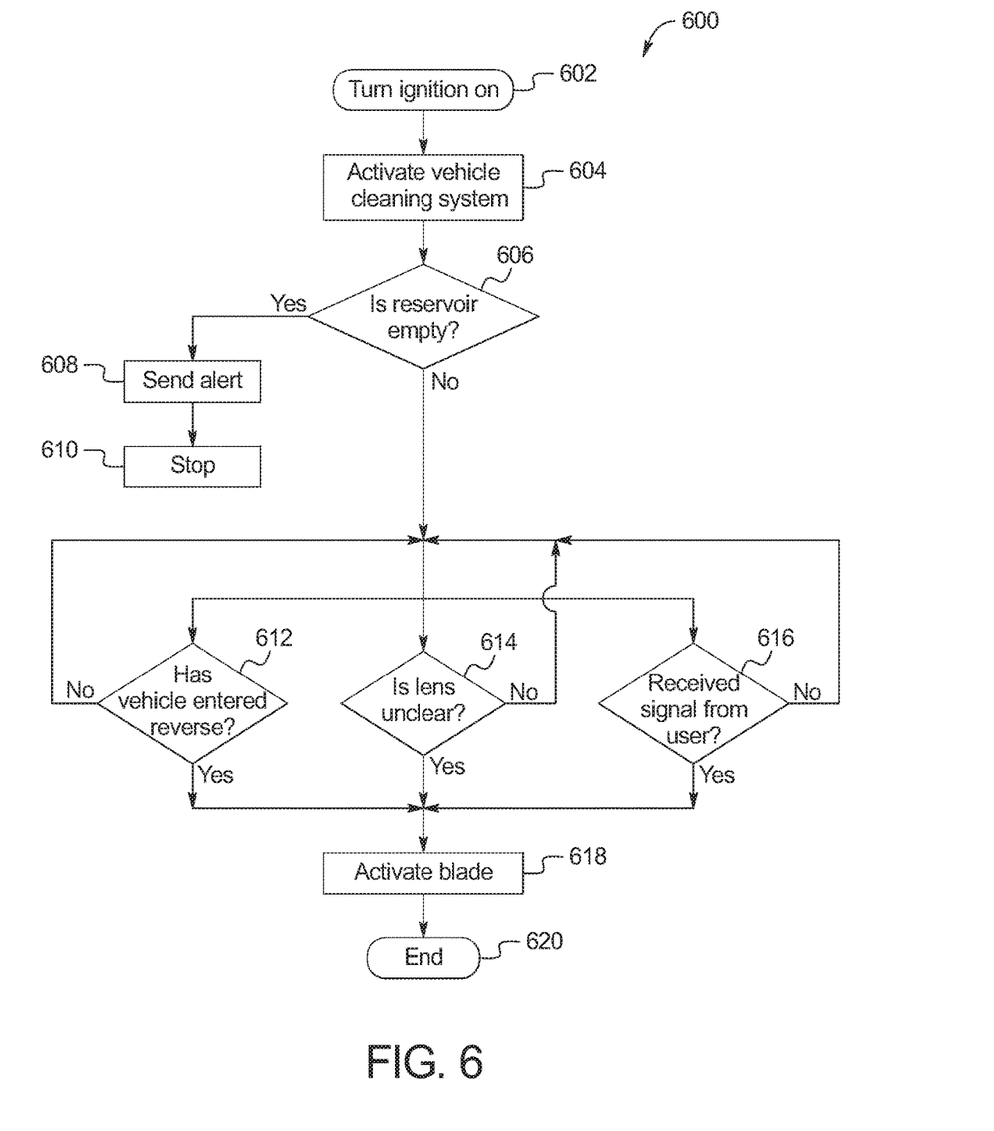
FIG. 6 illustrates a flowchart of an example method according to embodiments of the present disclosure

FIG. 6 illustrates a flowchart of an example method 600 according to embodiments of the present disclosure. Method 600 may provide a gravity based vehicle camera cleaning method. The flowchart of FIG. 6 is representative of machine readable instructions that are stored in memory (such as memory 124) and may include one or more programs which, when executed by a processor (such as processor 122) may cause vehicle 100 to carry out one or more functions described herein. While the example program is described with reference to the flowchart illustrated in FIG. 6, many other methods for carrying out the functions described herein may alternatively be used. For example, the order of execution of the blocks may be rearranged, blocks may be changed, eliminated, and/or combined to perform method 600. Further, because method 600 is disclosed in connection with the components of FIGS. 1-5, some functions of those components will not be described in detail below.

Initially, at block 602, method 600 may include turning on the ignition of the vehicle. At block 604, method 600 may include activating the vehicle cleaning system. This may include turning on one or more sensors, devices, or systems.

At block 606, method 600 may include determining whether the reservoir is empty. This may be done by one or more sensors or sensing systems, such as those described herein. If the reservoir is empty, method 600 may include sending an alert at block 608, and stopping at block 610.

But if the reservoir is not empty, method 600 may include moving to blocks 612, 614, and 616 either at the same time or in sequence. Block 612 may include determining whether the vehicle has entered reverse. Block 614 may include determining whether the lens is unclear. And block 616 may include determining whether a signal has been received from a use of the vehicle.

If any of the answers to the determinations in 612, 614, and 616 is yes, method 600 may include moving to block 618 in which the blade is activated. Activating the blade at block 618 may include responsively dispensing cleaning liquid on to the lens, and then wiping the cleaning liquid off using the blade. Then at block 620, method 600 may include stopping or turning off the cleaning system.

IV. Example Variations

Various features described above may be applied to vehicle cameras other than rear-view or backup cameras, such as any externally mounted vehicle camera.

Further, some examples may describe the movement of the blade as "vertical." In this sense, moving the blade vertically may mean a swiping motion across the surface of the lens similar to how an eyelid moves when a person blinks, such that the movement is vertical with respect to the camera and/or lens. It should be understood that where the camera is angled downward or on an angle, the vertical motion of the blade may be vertical with respect to the camera, while not necessarily vertical with respect to any other object.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle camera cleaning system comprising:
   a housing;
   a camera comprising a lens;
   a blade comprising two ends connected to the housing and spaced apart from each other at a predetermined distance, the blade being flexible and configured to clean the lens;
   a fluid reservoir configured to dispense fluid on the lens; and
   an actuator configured to actuate the blade to move across the lens, wherein the predetermined distance is maintained during actuation of the blade.

2. The vehicle camera cleaning system of claim 1, wherein the camera is a rear-view camera of a vehicle.

3. The vehicle camera cleaning system of claim 1, wherein the lens of the camera is convex.

4. The vehicle camera cleaning system of claim 1, wherein a contour of the blade matches a shape of a surface of the lens.

5. The vehicle camera cleaning system of claim 1, wherein an output of the reservoir is located directly above the lens.

6. The vehicle camera cleaning system of claim 1, wherein the blade is covered by the housing prior to actuation.

7. The vehicle camera cleaning system of claim 1, wherein the actuator actuates the two ends such that the blade moves in a blinking motion across the lens.

8. The vehicle camera cleaning system of claim 1,
   wherein the actuator actuates one of the two ends such that the blade moves in a blinking motion across the lens, and
   wherein the other one of the two ends is connected to the camera housing via a spring mechanism.

9. The vehicle camera cleaning system of claim 1, wherein the actuator moves the blade across the lens responsive to a vehicle entering a reverse gear.

10. The vehicle camera cleaning system of claim 1, further comprising a determiner circuit for determining when the lens of the camera is unclear, and wherein the actuator moves the blade across the lens responsive to determining that the lens of the camera is unclear.

11. The vehicle camera cleaning system of claim 1, wherein the blade is connected to a dispensing element, and wherein the actuator is further configured to move the dispensing element and the blade horizontally across the lens prior to actuating the blade vertically.

12. A method of cleaning a vehicle camera comprising:
    receiving an instruction to clean a vehicle camera lens disposed on a housing; and
    actuating a blade vertically across the lens;
    wherein a fluid reservoir for dispensing fluid using gravity via a one-directional gateway valve is located directly above the lens, wherein the fluid reservoir dispenses fluid responsive to actuation of the blade, wherein the blade is flexible and includes two ends connected to the housing and spaced apart from each other at a predetermined distance, and wherein the predetermined distance is maintained during actuation of the blade.

13. The method claim 12, wherein actuating the blade vertically across the lens comprises actuating both sides of the blade such that the blade moves in a blinking motion across the lens.

14. The method of claim 12,
   wherein actuating the blade vertically across the lens comprises actuating one of the two ends of such that the blade moves in a blinking motion across the lens, and
   wherein the other one of the two ends is connected to the camera housing via a spring mechanism.

15. The method of claim 12, wherein the actuating the blade vertically across the lens comprises actuating the blade responsive to a vehicle entering a reverse gear.

16. The method of claim 12, further comprising determining that the lens of the camera is unclear, and wherein the actuating the blade vertically across the lens comprises actuating the blade responsive to determining that the lens of the camera is unclear.

17. The method of claim 12, wherein the blade is connected to a dispensing element, the method further comprising:
   moving the dispensing element and the blade horizontally across the lens prior to actuating the blade vertically; and
   dispensing fluid onto the lens during movement of the dispensing element.

\* \* \* \* \*